United States Patent [19]

Pullen

[11] 4,361,061
[45] Nov. 30, 1982

[54] MACHINE TOOL FOR DRESSING THE END FACE OF AN ENGINE CYLINDER LINER

[75] Inventor: William H. Pullen, Seaforth, Australia

[73] Assignee: P. & O. Australia Limited, Sydney, Australia

[21] Appl. No.: 259,969

[22] Filed: May 4, 1981

Related U.S. Application Data

[63] Continuation of Ser. No. 79,426, Sep. 27, 1979.

[30] Foreign Application Priority Data

Oct. 4, 1978 [AU] Australia .............................. PD6221

[51] Int. Cl.³ .......................... B23B 5/00; B24B 19/00
[52] U.S. Cl. .................................. 82/4 R; 51/241 B; 51/241 S; 409/179; 409/296
[58] Field of Search ............ 409/175, 179, 199, 296, 409/313, 216; 29/156.4 WL; 82/4 R; 408/80, 82; 51/241 A, 241 B, 241 S, 241 VS

[56] References Cited

U.S. PATENT DOCUMENTS

| | | | |
|---|---|---|---|
| 143,080 | 9/1873 | Kichner et al. | 82/4 R |
| 2,297,074 | 9/1942 | Rohrdanz | 51/241 B |
| 3,483,796 | 12/1969 | Galbarini et al. | 409/216 |
| 4,069,624 | 1/1978 | Henry, Jr. | 51/241 B |
| 4,177,610 | 12/1979 | Farkas et al. | 51/241 S |

*Primary Examiner*—Z. R. Bilinsky
*Attorney, Agent, or Firm*—Vaden, Eickenroht, Thompson, Bednar & Jamison

[57] ABSTRACT

For machine dressing or grinding the end face of an engine cylinder liner particularly a heavy liner of the kind used in marine diesel engines, without removing the liner from its cylinder, a machine tool comprises a base which is locatable in the bore of the liner adjacent the face to be dressed, a beam disposed laterally of the base and rotatable about the upright axis of the base, a cutting tool and or grinding means carried by the beam and presentable to the liner end face while the beam is rotated thereby to dress it by a turning operation and or grinding.

7 Claims, 5 Drawing Figures

MACHINE TOOL FOR DRESSING THE END FACE OF AN ENGINE CYLINDER LINER

This is a continuation of application, Ser. No. 79,426, filed Sept. 27, 1979.

This invention relates to reciprocating engines in which the cylinder (or cylinders) is constituted by a cylindrical liner either of the wet or dry sleeve type. More particularly, the invention is concerned with liners of the kind indicated, as used in relatively large engines such as marine engines of diesel or other kind. In such engines the inside diameter of the liner or sleeve may be of the order of 1 meter, with a sleeve length of say 2 meters; in such cases the weight of the line could very well be of the order of 5 to 7 tons.

Liners as referred to above have an end face, which is usually stepped, being the upper end surface of the liner which is under pressure during use and upon which a cylinder cover is seated and forcibly held so to constitute, with the cylinder end face, a sealed joint required to be proof against gas leakage under the pressure of operation.

After relatively short terms of operation, the pressure end face of the liner is prone to leak gas through distortion and consequent loss of required sealing contact with the cylinder cover and thus it becomes necessary for the end face to be dressed so as to bring it back into leak-proof circumferential contact with the cover.

Hitherto, two common methods have been employed to dress the end faces of liners of the kind in question. The first of these is to leave the liner in situ in the engine and then apply a lapping ring charged with suitable abrasive material and manually operating the lapping ring until a true valve-like surface is formed on the liner end. This lapping operation is usually performed manually and is open to objection in several respects in that in the course of a single liner lapping the lap rings become worn and may have to be refaced by machining several times in the course of a single dressing operation and even so it is not always possible to produce a liner end face which is perfectly flat. The lapping operation is time-consuming and therefore can put a vessel out of commission for long periods. It follows from this also that the lapping process is extremely expensive in man-hours.

The objections to the lapping method are such that in many instances the indicated alternative procedure is adopted. This consists of lifting the liner out of the engine and taking it to a shore facility for machining in a lathe. This however is also objectionable because of the time involved in removing the liner, taking it to the workshop, bringing it back and replacing it, and in that the lifting and replacement of the liner from and into the ship usually requires special crane equipment having a lifting capacity beyond that of the lifting equipment normally available on the vessel.

The object of the present invention is to overcome the indicated disabilities in a very simple way by way of a machine tool with which a cylinder end face may be quickly and easily re-surfaced in situ.

It will be appreciated that although the machine tool subject hereof, is primarily intended for use with liners in situ, it is equally applicable for use on liners of the kind in question irrespective of whether they may be located either in situ in a vessel or in a workshop or elsewhere.

The invention provides, a machine tool for dressing the end face of an engine cylinder liner, comprising:

(a) a machine base stationarily positioned within the end portion of the liner contiguous to the end face to be dressed, (b) an upright stub shaft mounted on said base with its longitudinal axis coincident with that of the liner, and whereof an upper end portion extends above said base, (c) a diametrically disposed beam mounted on the upper end of said shaft so that the beam is rotatable about said axis above said end face, (d) means for rotating said beam about said axis, and (e) metal-dressing tool devices mounted on said beam for presentation to said end face.

An example of the machine tool subject hereof is illustrated in the drawings herewith.

FIGS. 3 and 4 are taken on a somewhat enlarged scale.

An engine liner is indicated at 6. It has an end face 7 which is shallowly stepped as indicated at 8. The machine tool includes a base in the form of a wheel 9 which is insertable into the liner at that end of it to be dressed. This "pressure" end is usually counterbored as indicated at 10 and if so the counterbore step may be used as a support for base 9 by reason of that base having its circumferential surface complementarily stepped. The base 9 fits within the liner as closely as is compatible with simple lowering of the base into the liner. With most liners the necessary clearance will be provided if the base is about five thousandths of an inch less than the internal diameter of the liner.

If the liner is not stepped, as indicated at 10, or in any event for that matter, the piston normally inside the liner may be raised to such a position as to constitute a rest upon which the base may stand.

Figure 1:
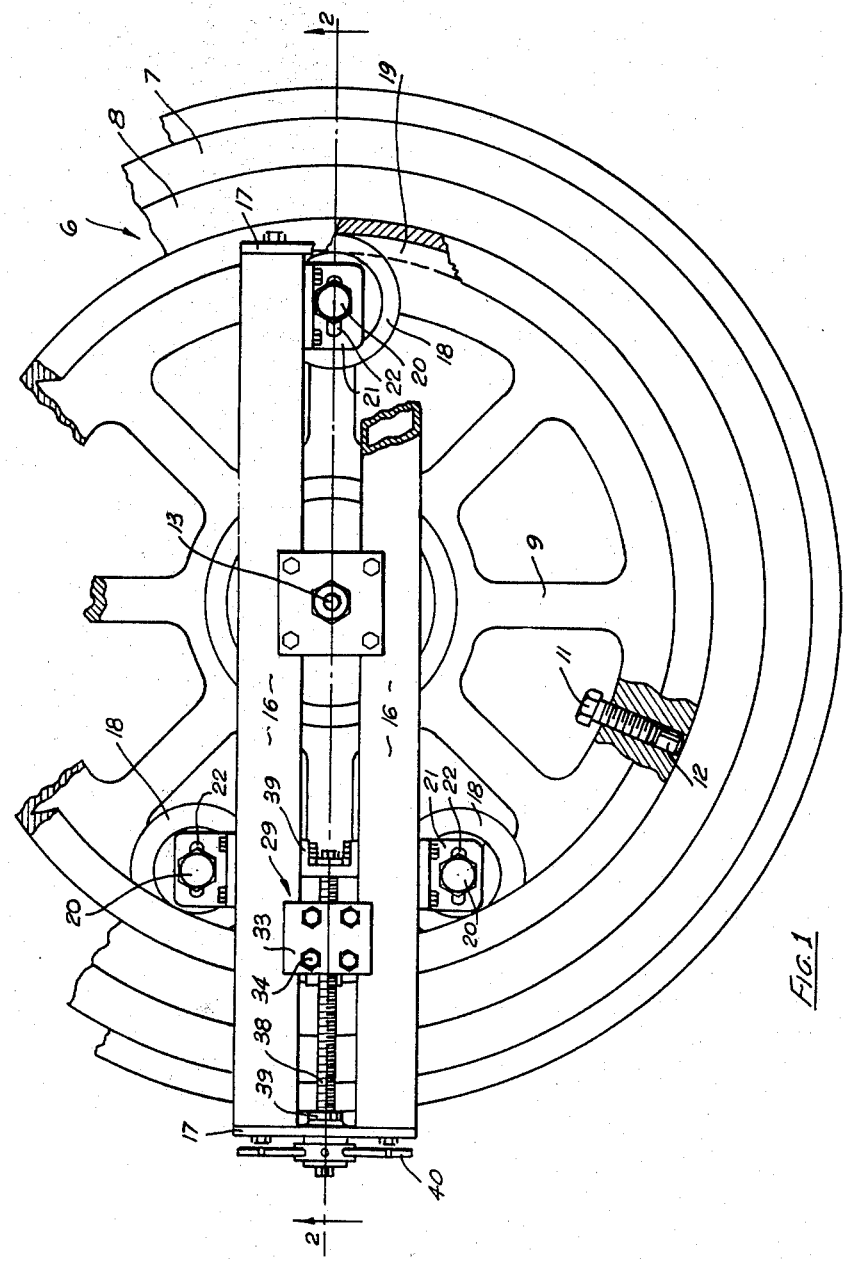
FIG. 1 is an incomplete plan of the machine tool.

When the machine tool is in use any tendency to reaction rotation of the base is better restrained, therefore it is desirable to provide the base with a clamp or preferably three or more clamps distributed evenly about the circumference of the base. One of these clamps is shown in FIG. 1. It consists of a set-screw 11 threaded in the base and able to bear against a radially slidable clamping column 12 preferably made of copper or other material softer than the metal of the liner. These clamps 11 may be tightened so to bring columns 12 to bear against the inside of the liner so to ensure centralisation of the base and at the same time provide effective restraint against any tendency on the part of the base to rotate relative to the liner.

Figure 2:
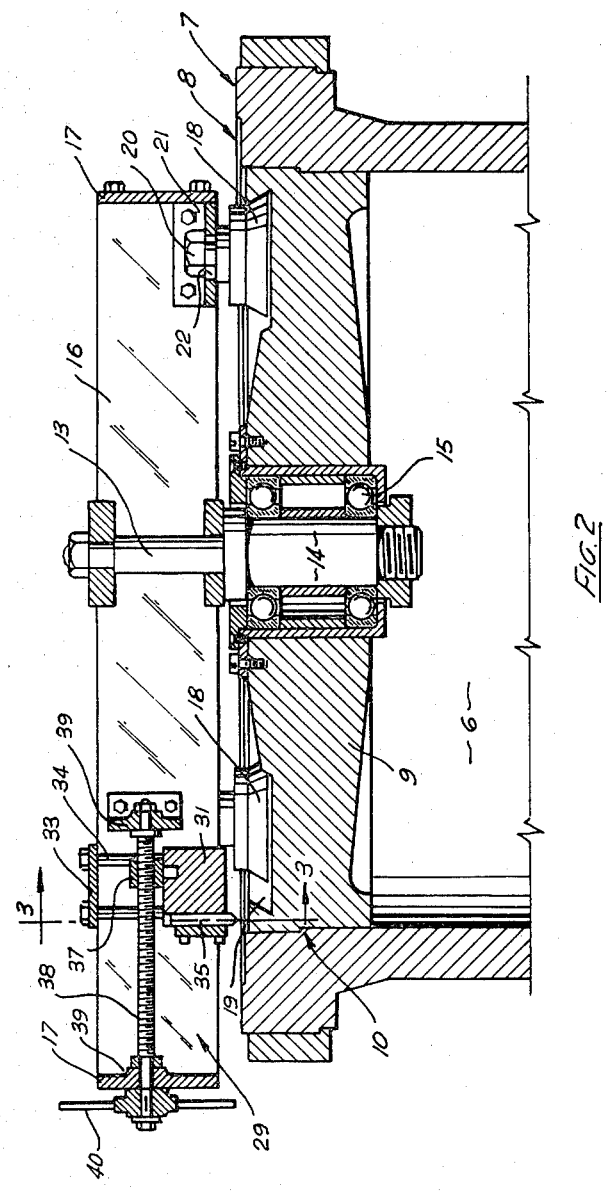
FIG. 2 is a sectional side elevational of a machine tool applied to an engine cylinder liner taken on line 2—2 in FIG. 1.
Figure 3:
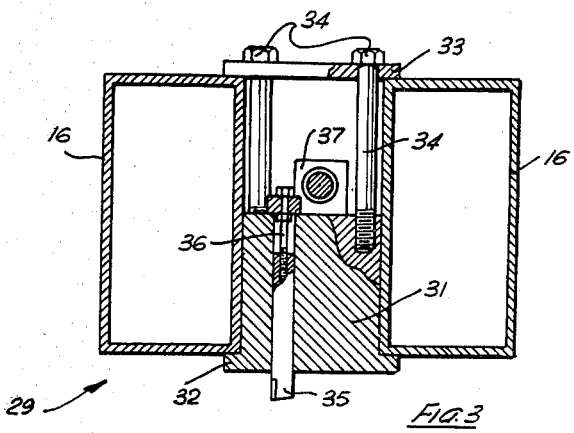
FIG. 3 is a sectional end elevation taken substantially on line 3—3 in FIG. 2.
Figure 4:
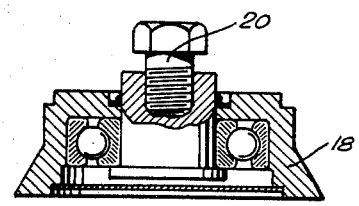
FIG. 4 is a medial cross-section through a guide roller, three of which are shown in FIG. 1. Both

The upright shaft 13 has its longitudinal axis coincident with that of the liner and the base, and the upper end of this shaft extends above the base. In the illustrated arrangement of the lower end 14 of the shaft is rotatably borne, by bearings 15, in the base 9, and the mentioned beam (consisting of twin members 16 held together at their ends by plates 17) is fixedly mounted on the upper end of shaft 13 so as to be diametrically disposed relative to the base and the liner. It will be appreciated that instead of the arrangement illustrated (mainly) in FIG. 2, the shaft 13 could be fixed as a post on the base 9 and the beam 16 would then be rotatably borne on the upper end of shaft 13.

The beam may be mounted in relation to the base 9 entirely by way of a shaft such as 13. However it is preferable for the beam to be provided with a plurality of guide rollers which appropriately engage the base. The illustrated arrangement consists of three freely rotatable rollers 18. These are preferably frustro-conically formed to run within a frusto-conical circumferential runway in base 9 as indicated at 19. The rollers 18 are held by screws 20 engaged in brackets 21 on beam 16. The screws 20 preferably extend through elongated holes indicated at 22 so that the rollers may be adjusted into firm but free-rolling contact with the runway 19.

Figure 5:
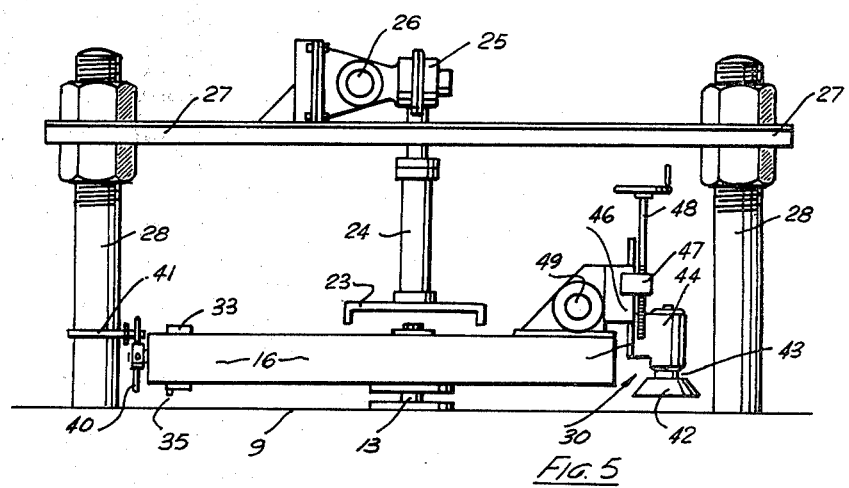
FIG. 5 is a partial end elevation of the machine tool shown in its association with the cover holding-down studs of the engine.

The means for rotating beam 16 relative to base 9, may consist of a channel-selectioned drive-key 23 which during normal usage is disposed between the twin members of beam 16. The key 23 is mounted on the lower end of a drive shaft 24 rotatable through appropriate reduction gears 25 and compressed air motor 26 or in any other convenient fashion. If an air or other motor is employed it may be mounted, as indicated in FIG. 5, on a support beam 27 fixedly held in position on the cylinder cover studs indicated at 28. The shaft 24 is preferably length adjustable (in conventional manner) so that the key 23 may be lifted from or lowered into drive engagement with beam 16.

Beam 16 carries metal-dressing tool devices. These may consist of a cutting head indicated at 29 or a grinding head indicated at 30. For preference, both of these items are incorporated so that the liner end face may be roughed by cutting and finished by grinding.

The cutting head 29 comprises a tool-holder block 31 secured by flanges 32, clamping plate 33 and bolts 34 so as to permit the block 31 to be slidable longitudinally of the beam members 16. Block 31 carries a conventional turning tool indicated at 35. This tool is adjustable for protrusion from block 31 by operation of a screw 36 as well understood. To advance the tool 35 radially across face 8 in order to perform the turning operation, block 31 is furnished with feed means which include a driving nut 37 which threads on a lead screw 38. This lead screw is rotatable in bearings 39 on beam 16, and, beyond the adjacent end of the beam, the lead screw carries a spoked star wheel 40 which is arranged to mesh, one spoke at a time, with a stationary obstruction finger indicated at 41 (see FIG. 5) upon each revolution of beam 16. Obstruction finger 41 may be fixedly but removably secured on one of the cylinder studs 28 so as to intrude into the circular path followed by the star wheel 40.

For preference, a grinding wheel 42 is carried on an arbor 43 in a drive motor casing 44 on guides 45 slidable in runway 46. In this instance a nut 47 is provided so that by use of lead screw 48 the grinding wheel may be brought to bear upon the work. If desired the grinding head may have a base in two parts pivoted together at 49 so that the grinding wheel may be tilted and held in tilted adjustment so to ensure proper presentation of the wheel 42 to the work. Alternatively, the grinder head may be adjustably mounted on beam 16 in much the same manner as tool-holder block 31 so that the grinding head may be fed radially during rotation of the beam 16.

I claim:

1. A machine tool for dressing the end face of an upright engine cylinder liner, comprising:
   (a) a machine base stationarily positioned within the end portion of the liner, contiguous to the end face to be dressed,
   (b) an upright stub shaft mounted on said base with its longitudinal axis coincident with that of the liner, and whereof an upper end portion extends above said base,
   (c) a diametrically disposed beam on the upper end of said shaft so that the beam is rotatable about said axis above said end face.
   (d) means for rotating said beam about said axis,
   (e) metal-dressing tool devices mounted on said beam for presentation to said end face,
   (f) a plurality of guide rollers on said beam, and
   (g) said base having a circumferential runway groove within which said guide rollers ride free to rotate but engage with said base.

2. A machine tool according to claim 1 wherein said beam consists of a pair of parallel spaced-apart twin members and the means for rotating said beam comprise a motor driven key emplaced between said twin members.

3. A machine tool according to claim 2 wherein said metal-dressing tool devices comprise a tool-carrier block mounted between said twin members and movable longitudinally therebetween.

4. A machine tool according to claim 3 wherein said tool devices include feed means for moving said block relative to said twin members, and said feed means comprise a nut on said block, a lead screw which threads through said nut and is borne by its ends on said beam and means to rotate said lead screw.

5. A machine tool according to claim 1 wherein said metal-dressing tool devices include a grinding mechanism movably mounted on said beam.

6. A machine tool according to claim 1 wherein said base includes at least one clamping screw threaded within said base and adapted to be tightened against the interior of the liner.

7. A machine tool for dressing the end face of an upright engine cylinder liner having an interior polished cylindrical surface adapted to reciprocably receive a piston comprising:
   (a) a machine base stationarily positioned within the end portion of the liner, contiguous to the end face to be dressed, said base including a wheel adapted to be entered into the liner and held upon a circumferential step therein co-axially therewith by releaseably mounting means not engaging the polished cylindrical surface to secure the machine in operable position relative to the liner,
   (b) an upright stub mounted on said base with its longitudinal axis coincident with that of the liner, and whereof an upper end portion extends above said base,
   (c) a diametrically disposed beam mounted substantially mid length on the upper end of said shaft for rotation relative to said base so that the beam is rotatable about said axis above said end face,
   (d) means for rotating said beam about said axis and said means carried on a mounting separate from said base,
   (e) metal-dressing tool devices mounted on said beam for presentation to said end face.
   (f) a plurality of downwardly depending frusto-conical guide rollers carried on said beam at a location spaced laterally from said upright stub, and (g) said base having a circumferential frusto-conical runway groove within which said guide rollers ride free to rotate but engaged with said base.

* * * * *